Figure 1:
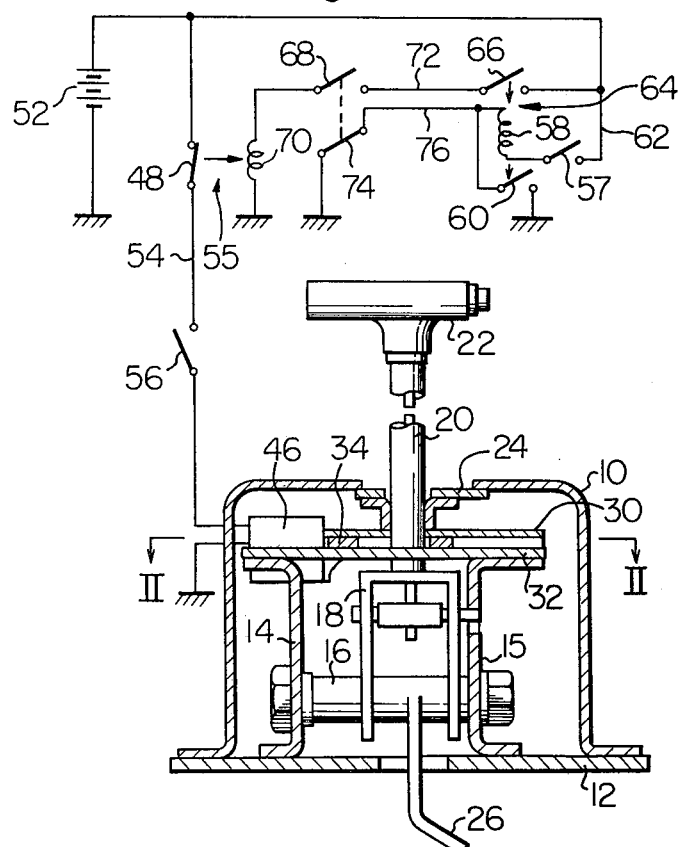

United States Patent [19]
Okazaki

[11] 3,939,939
[45] Feb. 24, 1976

[54] TRANSMISSION LOCKING DEVICE
[75] Inventor: Nobuo Okazaki, Chigasaki, Japan
[73] Assignee: Nissan Motor Co., Ltd., Yokohama, Japan
[22] Filed: Sept. 18, 1974
[21] Appl. No.: 507,121

[30] Foreign Application Priority Data
Sept. 20, 1973   Japan................. 48-109343[U]

[52] U.S. Cl................ 180/82 C; 70/247; 180/82 A
[51] Int. Cl............................................ B60r 21/10
[58] Field of Search............ 180/82 C; 70/245, 246, 70/247, 248, 249, 250, 251, 201, 202; 74/473, 475; 307/10 SB; 340/52 E; 280/150 SB

[56] References Cited
UNITED STATES PATENTS

| | | | |
|---|---|---|---|
| 1,362,685 | 12/1920 | Farah.................................. | 70/251 |
| 1,521,954 | 1/1925 | Hymel................................. | 70/202 |
| 1,903,017 | 3/1933 | Warren et al....................... | 70/248 |
| 3,729,059 | 4/1973 | Redmond.......................... | 180/82 C |
| 3,859,625 | 1/1975 | Eggert............................... | 180/82 C |

*Primary Examiner*—Kenneth H. Betts

[57] ABSTRACT

The selector lever in "N" is caught and locked by a notch of a plate moving in response to an actuated solenoid energized by failure of the driver to fasten his seat belt.

3 Claims, 2 Drawing Figures

U.S. Patent  Feb. 24, 1976  3,939,939

TRANSMISSION LOCKING DEVICE

The present invention relates generally to a locking device for preventing a transmission of a motor vehicle from being shifted to a driving gear and particularly to a device for compelling an occupant of the vehicle to fasten his seat belt before driving the vehicle by locking a selector lever controlling the transmission in a neutral or parking position if the occupant fails to fasten the seat belt.

Motor vehicles are at present required by law in many countries to have seat belts. The purpose of this is to prevent an occupant of the vehicle from being thrown forward from his seat by a collision of the vehicle to protect the occupant from injury by a collision of the occupant against structural parts of the vehicle which is called the "second collision". However, the occupants tend to fail to fasten the seat belts because of troublesome steps or procedures for fastening the seat belts and because of the seat belts restraining freedom to perform manipulation of the vehicle and to relax the body of the occupant. Thus, most of the seat belts are kind of surplus equipment in the vehicles and most of the vehicles start and move with the seat belts being unused by the occupants.

In order to compel vehicle drivers to fasten seat belts, a device has been proposed which provides a warning signal and prevents starting of the engine when a vehicle driver fails to fasten his seat belt. Thus, the device has an inconvenience or disadvantage in that manipulation and inspection of the vehicle for starting the engine is impossible unless the vehicle occupant fastens his seat belt.

It is, therefore, an object of the invention to provide a device which compels a vehicle occupant to fasten a seat belt after starting the engine and before starting the vehicle.

It is a further object of the invention to provide a locking device which prevents an automatic transmission of a motor vehicle from being shifted to a driving gear when an occupant of the vehicle fails to fasten a seat belt and which allows the engine to start without the occupant fastening the seat belt.

Figure 2:
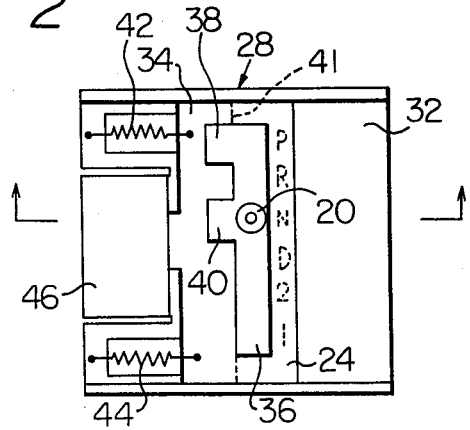

These and other objects and advantages of the invention will become more apparent from the following detailed description taken in conjunction with the accompanying drawings in which:

FIG. 1 is a schematic cross-sectional view of a preferred embodiment of a locking device according to the invention; and FIG. 2 is a schematic plan view of a main part of the locking device substantially along a line II—II of FIG. 1.

Referring now to FIGS. 1 and 2, a schematic representation of a portion of a motor vehicle (no numeral) is shown to include an enclosure 10 which is fixedly mounted on the floor 12 of the vehicle and which encloses support members 14 and 15 fixedly mounted on the floor 12. The support members 14 and 15 rotatably support a spindle 16 to which a fork 18 is fixedly secured. A manually operated gear selector lever 20 having at its upper end a hand grip 22 extends internally of the enclosure 10 and is fixedly connected at its lower end to the fork 18 so that it is swingable around the axis of the spindle 16. The selector lever 20 has its positions P (parking), R (reverse), N (neutral), D (automatically shifting forward driving gear ratios from 1st gear to top gear), 2 (Lock up 2nd gear) and 1 (lock up 1st gear) which are attainable by manipulating the selector lever 20 and which are marked in this order on an indicator plate 24 attached to the enclosure 10 adjacent to the selector lever 20. A linking lever 26 is fixedly secured to the spindle 16 and extends to an automatic transmission (not shown) of the floor shift type to transmit swinging movement of the selector lever 20 to the automatic transmission for control thereof.

A locking device 28 is provided to be combined with the selector lever 20 or to comprise the same as a part of component elements. The locking device 28 comprises two guide plates 30 and 32 which are fixedly mounted on the support members 14 and 15 and which are disposed opposite to and spaced from each other. A locking plate 34 is slidably interposed between the guide plates 30 and 32. The guide plates 30 and 32 and the locking plate 34 have formed therein elongate apertures 36, respectively, which are aligned with each other and through which the selector lever 20 passes and in which the same is swingable. The selector lever 20 has in the apertures 36 its positions as shown by dotted letters in FIG. 2 which correspond to its positions P, R, N, D, 2 and 1 mentioned above. The locking plate 34 has formed therein two recesses 38 and 40 which are spaced from each other and which join the elongate aperture 36 in the locking plate 34 and which are in alignment and engageable with the selector lever 20 positioned in the non-drive positions P and N, respectively. A portion of the locking plate 34 at the right side in the drawings of dotted lines 41 as shown in FIG. 2 may be omitted or dispensed with. The locking plate 34 is movable in a direction perpendicular to a plane of the swinging movement of the selector lever 20 and between a rest or non-locking position as shown in the drawings and an operative or locking position in which one of the recesses 38 and 40 engages the selector lever 20 to lock the same in the parking or neutral position P or N thereby inhibiting the transmission from being shifted to a driving gear. The recess 38 may be dispensed with, if desired. Helical extension springs 42 and 44 are provided to urge the locking plate 34 to the rest position and to hold the locking plate 34 in the rest position when the driver (not shown) of the vehicle fastens the seat belt (not shown) provided in the vehicle to encircle the driver for his protection and safety. A solenoid 46 is provided to control or actuate the locking plate 34. The coil (not shown) of the solenoid 46 is energized to move the locking plate 34 fixed to its core from the rest position to the actuated position overcoming the forces of the springs 42 and 44 when the driver fails to fasten the seat belt.

The solenoid 46 is connected to a first electric control circuit 54 including a normally closed relay switch 48 and an electric power source 52 such as a battery which are connected in series to each other for passing electric current through the coil of the solenoid 46 to energize the same. The switch 48 forms a part of a relay 55 and is opened when a relay coil 70 forming a part of the relay 55 is energized. The control circuit 54 preferably has an ignition switch 56 for an engine of the vehicle or a switch which is closed when the engine operates and which is opened when the engine is stopped. The source 52 is connected to a second electric control circuit 62 including a normally open switch 57, a relay coil 58 and a normally open relay switch 60 which are connected in series to each other. The switch 57 is closed when the operator sits down on his seat of the vehicle. The relay coil 58 and the relay switch 60 form a part of a relay 64 and the switch 60 is closed when the relay coil 58 is energized. The source 52 is also connected to a third electric control circuit 72 including a normally open relay switch 66, a normally open switch 68 and the relay coil 70 which are connected in series to each other. The relay switch 66 forms a part of the relay 64 and is closed when the relay coil 58 is energized. The switch 68 is closed when the operator fastens the seat belt. A normally closed fifth switch 74 is connected to the relay coil 58 to form a fourth electric control circuit 76. The switch 74 is opened when the switch 68 is closed. The relay 64 is of a self-holding type so that the switches 60 and 66 remain closed when the switch 74 is opened.

The operation of the locking device 28 thus constructed is as follows:

When the operator sits down on his seat, starts the engine and fails to fasten the seat belt with the selector lever being positioned in the neutral or parking position N or P, the switch 57 is closed to cause energization of the relay coil 58 so that the switches 60 and 66 are closed. The switch 68 remains open to cause de-energization of the relay coil 70. De-energization of the relay coil 70 keeps the switch 48 closed to cause energization of the coil of solenoid 46. Energization of the coil of the solenoid 46 causes the core of the solenoid 46 and the locking plate 34 to be moved from the rest position to the operative position overcoming the force of the springs 42 and 44 and causes the recess 38 or 40 to engage the selector lever 20. As a result, the selector lever 20 is retained in the recess 38 or 40 and is locked in the neutral or parking position N or P to inhibit the transmission from being shifted to a driving gear and accordingly to inhibit the vehicle to start moving. In this state, when the operator fastens the seat belt, the switch 68 is closed to cause energization of the relay coil 70. In this instance, the switches 60 and 66 remain closed. The switch 48 is opened by energization of the relay coil 70 to cause de-energization of the coil of the solenoid 46. De-energization of the coil of the solenoid 46 causes the locking plate 34 to be moved from the operative position to the rest position by the retracting force of the springs 42 and 44 for the recess 38 or 40 to disengage the selector lever 20. As a result, the selector lever 20 is uninhibited to shift from the parking or neutral position to set the transmission to a desired driving gear and automatic range by the operator to start the vehicle to move.

Although in the locking device 28, when the operator takes off the seat belt while driving the vehicle, there is the possibility that the locking plate 34 is moved to the operative position and will lock the selector lever 20 in the neutral or parking position. Such a possibility or action is dangerous and should be avoided. To this end, the first electric control circuit 54 preferably has a switch which is closed when the vehicle is at a standstill and which is opened to render the locking device 28 inoperative when the vehicle is driven.

It should be appreciated that the problem of inhibiting a motor vehicle from starting is solved when a driver of the vehicle fails to carry out a precautionary safety procedure or steps for protecting the occupant such as fastening the seat belt, by a locking device according to the invention. The construction and operation of the locking device are simplified and secure by a locking plate which has formed therein first and second notches or recesses engaging a manually operated gear selector lever of an automatic transmission positioned in neutral or parking position, respectively, and which is moved to an operative position in which the first or second recess or notch engages the selector lever to lock the same in the neutral or parking position.

It should be also appreciated that the locking device according to the invention has an advantage in that manipulation and inspection of the vehicle for starting an engine thereof is possible without fastening the seat belt.

Although the switch 68 has been described such that it is closed when the driver fastens his seat belt, the switch 68 may be closed only when all of occupants of the vehicle fasten their seat belts.

What is claimed is:

1. A locking device for preventing an automatic transmission of a motor vehicle from being shifted to a driving gear when a vehicle occupant fails to carry out precautionary safety steps to protect the occupant, comprising a selector lever movable to control setting of said automatic transmission, a locking member movable from a rest position to a locking position for directly locking said selector lever in a neutral position, electric means for, when actuated, moving the locking member from the rest position to the locking position, and sensing means for actuating the electric means when the sensing means sense that the occupant fails to carry out the precautionary safety steps, in which the locking member comprises a locking plate having a recess engageable with the selector lever which is positioned in the neutral position for locking the selector lever when in the locking position and biasing means urging the locking plate to hold the same in the rest position when the occupant carries out the precautionary safety steps and the electric means comprises a solenoid the coil of which when enerigized urges the core and the locking plate from the rest position to the locking position against the force of the biasing means when the occupant fails to carry out the precautionary safety steps, and in which the locking member further comprises two guide plates which are fixedly disposed opposite to each other and between which said locking plate is slidably interposed, each of the two guide plates having formed therein an elongate aperture through which said selector lever passes and in which the same is swingable.

2. A locking device for preventing an automatic transmission of a motor vehicle from being shifted to a driving gear when a vehicle occupant fails to carry out precautionary safety steps to protect the occupant, comprising a selector lever movable to control setting of said automatic transmission, a locking member movable from a rest position to a locking position for directly locking said selector lever in a neutral position, electric means for, when actuated, moving the locking member from the rest position to the locking position, and sensing means for actuating the electric means when the sensing means sense that the occupant fails to carry out the precautionary safety steps, in which the locking member comprises a locking plate having a recess engageable with the selector lever which is positioned in the neutral position for locking the selector lever when in the locking position and biasing means urging the locking plate to hold the same in the rest position when the occupant carries out the precautionary safety steps and the electric means comprises a solenoid the coil of which when energized urges the core and the locking plate from the rest position to the locking position against the force of the biasing means when the occupant fails to carry out the precautionary safety steps, and in which the electric means comprises a first electric control circuit including a normally closed relay switch, a second electric control circuit connected with said first control circuit and including a normally open switch which is closed when said occupant sits down on his seat, a first relay coil and a normally open relay switch which cooperates with said relay coil and which is closed when said relay coil is energized, a third electric control circuit connected with said first control circuit and including a normally open relay switch which cooperates with said relay coil and which is closed when said relay coil is energized, a normally open second switch which is closed when the occupant fastens his seat belt and a second relay coil cooperating with said normally closed relay switch, said normally closed relay switch being opened when said second relay coil is energized, and a fourth electric control circuit connected with said first relay coil and including a normally closed second switch, said normally closed second switch being opened when said normally open second switch is closed, said normally open relay switches being a self-holding type.

3. A locking device for locking a transmission of a motor vehicle in a predetermined non-drive position, comprising a selector lever movable to control setting of a transmission of a motor vehicle, a locking plate movable between a non-locking position for locking said selector lever in a predetermined non-drive position, said locking plate having a recess engageable with said selector lever, which is in said predetermined non-drive position, to lock it when in said locking position, two guide plates which are fixedly disposed opposite to each other and between which said locking plate is slidably interposed, each of said guide plates being formed therein with an elongate aperture through which said selector lever passes and in which the same is swingable, and actuating means for moving said locking plate from said non-locking position into said locking position when a vehicle occupant fails to carry out a precautionary safety step to protect said vehicle occupant and from said locking position into said non-locking position when said vehicle occupant carries out said precautionary safety step.

* * * * *